May 10, 1949.  E. O. ERIKSSON  2,469,817
SUCTION CHUCK
Filed Sept. 29, 1945
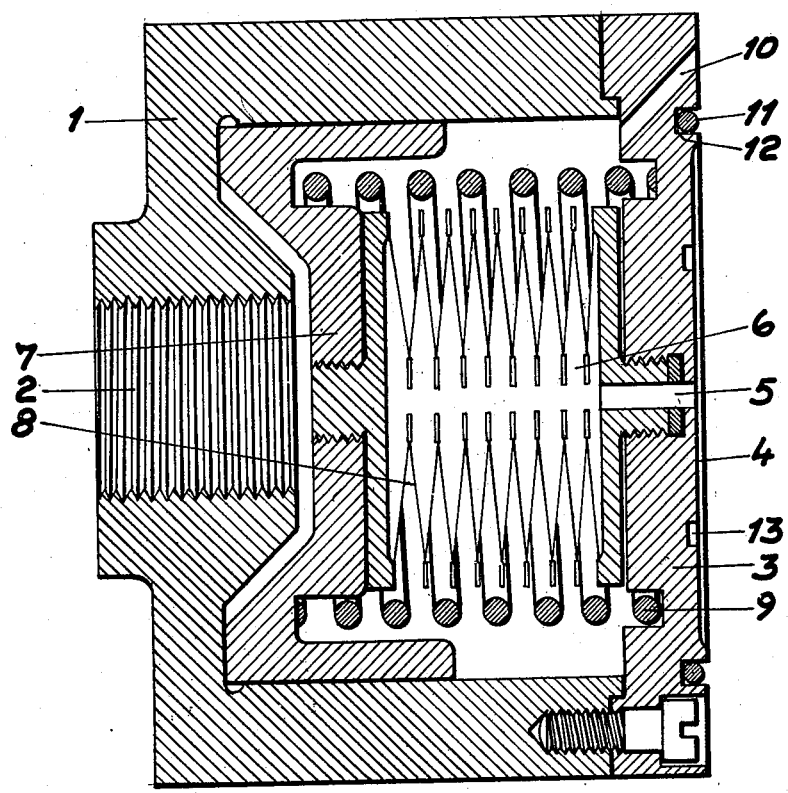
Inventor:
Eric Otto Eriksson
by Richardson and David.
Attorneys Patented May 10, 1949

2,469,817

UNITED STATES PATENT OFFICE 2,469,817

SUCTION CHUCK

Erik Otto Eriksson, Hornsjofors, Sweden

Application September 29, 1945, Serial No. 619,343
In Sweden September 22, 1944

1 Claim. (Cl. 279—3)

In the treatment of iron and steel objects in lathes and other machine tools it is known to use so-called magnetic chucks for retaining the object. Of course, this expedient is not available when unmagnetic objects are to be treated but in such cases it has been necessary to use chucks with more labour-requiring jaws. It has also been suggested to use so-called suction chucks for this purpose, in which the object to be treated is placed against a closed packing strip in the chuck, whereafter the air is partially sucked out between the object and the suction chuck, whereby the object will be retained by the relative overpressure on the outside of the object. However, such suction chucks have hitherto been intended for the treatment of relatively small objects only. See, for example, the U. S. Patents Nos. 904,679 and 1,430,050.

The present invention relates to a suction chuck for lathes and other machine tools, which chuck is provided with a contact surface for the object to be treated in the machine tool, at least one duct opening in the contact surface, and packing means, e. g. packing strips of rubber inserted in grooves in the contact surface, by means of which strips a hermetical tightening between the contact surface and the object to be treated can be obtained around the opening of the duct, the said duct being connected with a room with variable volume, which room, when actuated by compressed air on the outside of at least one of the walls of the room, is arranged to be compressed against the action of a spring device, in order that, when the action of the compressed air ceases, the spring device shall strive to enlarge the room to its original volume, whereby an object applied tightly against the contact surface will be sucked on thereto by the vacuum formed in the room when the same is enlarged.

The invention is to be described more particularly below reference being had to the accompanying drawing, in which an embodiment of a suction chuck according to the invention is illustrated in cross section.

The suction chuck consists of a cylindric body 1, which by means of a threaded hole 2 can be screwed into the machine tool. In the body there is fixed a disk 3, the outer surface 4 of which is formed as a contact surface for the objects which are to be treated in the machine tool and thereby retained in the suction chuck. In the centre of the contact surface there opens a duct 5 extending from a room 6 located within the body 1. The size of the volume of the room 6 is variable thereby that, besides being limited by the stationary wall formed by the disk 3, the room is also limited by a displaceable wall located opposite the stationary wall, the said displaceable wall being formed by an axially displaceable disk 7 and by bellows 8 located between the disks 3 and 7.

The suction chuck shown on the drawing is used in the following way. The suction chuck is by means of the threaded hole 2 screwed on to a shaft (not shown) in the machine tool, the threads of the said shaft corresponding to the threads of the hole. Through a duct in the said shaft compressed air is admitted into the cavity of the cylindric body 1 to the left of the displaceable disk 7. The disk 7, which is formed as a plunger displaceable within the cylindric body, is moved by the compressed air to the right on the drawing against the action of a relatively strong compression spring 9. The bellows 8 are compressed, whereby the air in the room 6 is pressed out through the duct 5. The air outside the room 6 between the disks 3 and 7 is at the same time pressed out through a duct 10 in the disk 3. The object to be treated is now applied against the contact surface 4 of the disk 3 a tightening between the object and the said disk being obtained by a packing strip 11 of rubber or other suitable material inserted in a recess 12 extending around the mouth of the duct 5. The room to the left of the disk 7 is now shut off from the compressed air source by means (not shown) and is connected with the atmosphere, whereby the pressure in this room naturally sinks so that it becomes equal to the pressure of the atmosphere. At the first moment the pressures in the room to the left of the disk 7 and in the room 6 to the right of the disk 7 become equal, and consequently the spring 9 is now able to move the disk 7 to the left, the bellows 8 being expanded and the volume of the room 6 being enlarged. Due to the fact that the object to be treated now prevents the atmosphere from entering the room 6, the pressure in the said room sinks, whereby the object is sucked on to the contact surface 4. The object can now be treated. When after finished treatment the object is to be detached from the suction chuck, it is proceeded in such a way that compressed air is admitted again into the room to the left of the displaceable disk 7, the said disk being moved to the right during compression of the bellows 8. The pressure within the room 6 now becomes equal to the outer pressure again and the object gets loose from the suction chuck and can be replaced by the next object. The said object is placed against the contact surface 4 just as the former object, and then the compressed air in the room to the left of the disk 7 is let out, whereby the object is sucked on to the suction chuck and so on.

It is of course advantageous if, when the bellows 8 have been compressed, the volume of the room 6 is as small as possible. For this purpose the bellows 8 are preferably made of a number of circular metallic disks provided with a central hole, the said disks being welded on to one another alternately at their outer edges and along the edge of the respective hole. In order that the volume of the room 6 now shall become as small as possible when the bellows 8 have been compressed, the diameter of the holes in the metallic disks have been made relatively small, as will be seen from the drawing.

Having now described my invention, what I claim as new and desire to secure by Letters Patent is:

In a pneumatic chuck for lathes and other machine tools, the combination of a head, a portion of its outer surface formed to being able to contact or near contact the work to be fixed to the chuck, said surface being surrounded by a packing for tighting against said work, a cylindrical chamber within the chuck, a piston in said chamber, a combined inlet and outlet for fluid at one side of the piston, a suction bellows and a compression spring located between one end of the chamber and the last mentioned piston side, said spring tending to move the piston from the last mentioned end of the chamber and to stretch the bellows, said bellows having a port which ends in the surface above mentioned, an air compressor, the first mentioned combined inlet and outlet being located in the rotation centre of the head in order to facilitate the maintenance of the connection between the chamber and the air compressor during the rotation of the chuck.

ERIK OTTO ERIKSSON.

REFERENCES CITED

The following references are of record in the file of this patent:

UNITED STATES PATENTS

| Number | Name | Date |
| --- | --- | --- |
| 1,041,028 | Church | Oct. 15, 1912 |
| 1,294,103 | Hitchcock | Feb. 11, 1919 |
| 1,430,050 | Becker | Sept. 26, 1922 |
| 1,618,378 | Hatcher | Feb. 22, 1927 |

FOREIGN PATENTS

| Number | Country | Date |
| --- | --- | --- |
| 572,877 | France | June 14, 1924 |